(12) United States Patent
Schultz et al.

(10) Patent No.: US 7,562,924 B2
(45) Date of Patent: Jul. 21, 2009

(54) VEHICLE JACK AND TOOL BAG INSTALLATION

(75) Inventors: Carl J Schultz, Redford Township, MI (US); Ian N Dupret, Farmington Hills, MI (US); Henry J Ziaja, Dearborn, MI (US); Randolph C Smith, White Lake, MI (US)

(73) Assignee: Chrysler LLC, Auburn Hills, MI (US)

( * ) Notice: Subject to any disclaimer, the term of this patent is extended or adjusted under 35 U.S.C. 154(b) by 491 days.

(21) Appl. No.: 11/332,111

(22) Filed: Jan. 13, 2006

(65) Prior Publication Data

US 2007/0176452 A1 Aug. 2, 2007

(51) Int. Cl.
*B60R 11/06* (2006.01)
(52) U.S. Cl. .................. 296/37.14; 296/37.8; 296/37.1; 296/37.13; 296/37.2
(58) Field of Classification Search ................ 296/37.1, 296/37.2, 37.8, 37.13, 37.14
See application file for complete search history.

(56) References Cited

U.S. PATENT DOCUMENTS

| 1,455,549 | A | * | 5/1923 | Robison ................. 296/37.13 |
| 2,649,191 | A | * | 8/1953 | McLaughlin ................ 206/373 |
| 3,513,969 | A | * | 5/1970 | Roff ............................. 206/577 |
| 4,750,774 | A |   | 6/1988 | Pickering |
| 5,288,000 | A |   | 2/1994 | Adamson |
| 5,702,144 | A | * | 12/1997 | Matsuura et al. .......... 296/37.13 |
| 5,894,974 | A |   | 4/1999 | Jensen |
| 5,979,953 | A | * | 11/1999 | Rinehart ...................... 293/106 |
| 6,199,693 | B1 | * | 3/2001 | Hung ........................... 206/349 |
| 6,230,949 | B1 |   | 5/2001 | O'Connell et al. |
| 6,626,423 | B2 | * | 9/2003 | Doswell .................... 254/93 H |
| 7,036,697 | B2 | * | 5/2006 | Hwang et al. ............. 224/42.14 |
| 2005/0088005 | A1 | * | 4/2005 | Krueger et al. ............. 296/37.8 |
| 2005/0134070 | A1 | * | 6/2005 | Plentis et al. ............... 296/37.1 |

* cited by examiner

*Primary Examiner*—Christopher P Ellis
*Assistant Examiner*—Jacob Meyer
(74) *Attorney, Agent, or Firm*—Ralph E. Smith

(57) ABSTRACT

An installation is provided in a cargo area of a vehicle for the stowage of a vehicle jack and tools useful in the changing of a wheel of the vehicle. The installation includes a receptacle in a recess in a deck of the cargo area. The receptacle includes an open top container having space to accommodate the jack and the tools. A cover plate across the top of the container covers a portion of the top only, leaving an access opening through which the jack and the tools may be inserted into and removed from the space in the receptacle.

18 Claims, 5 Drawing Sheets

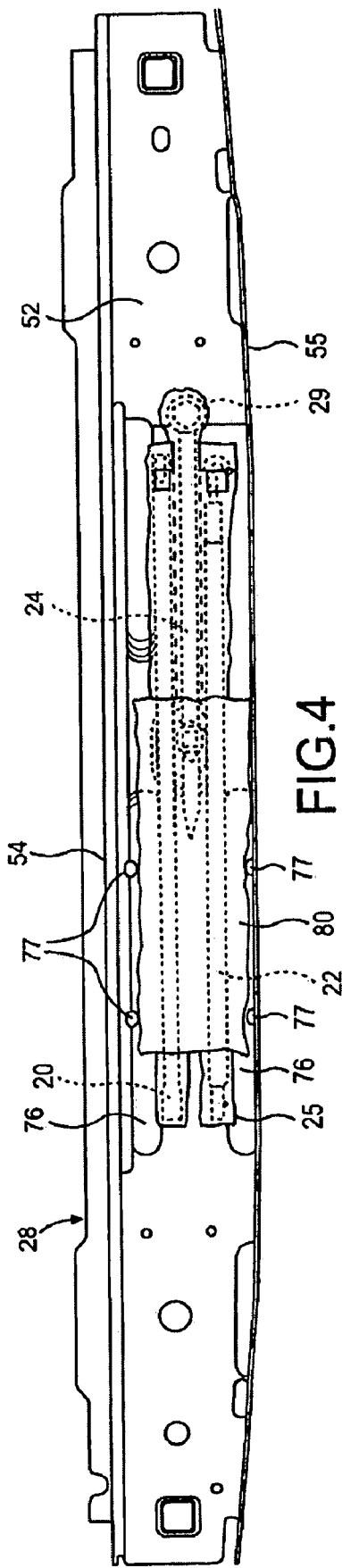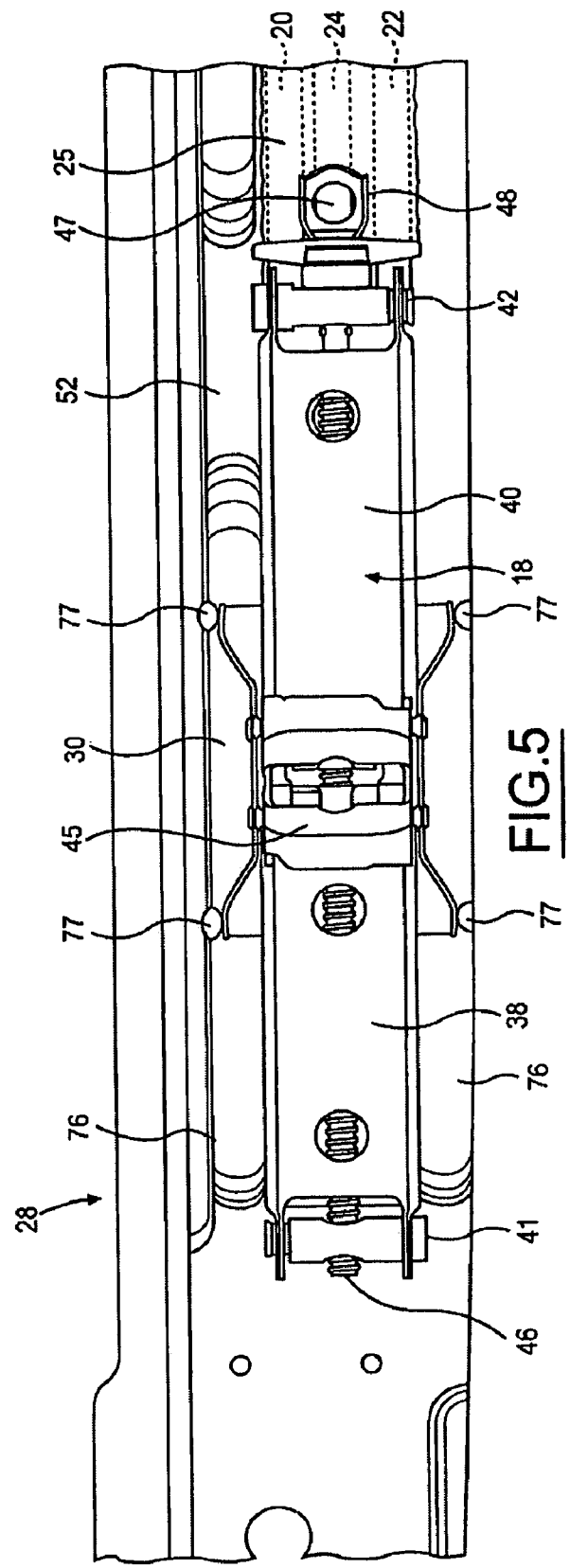

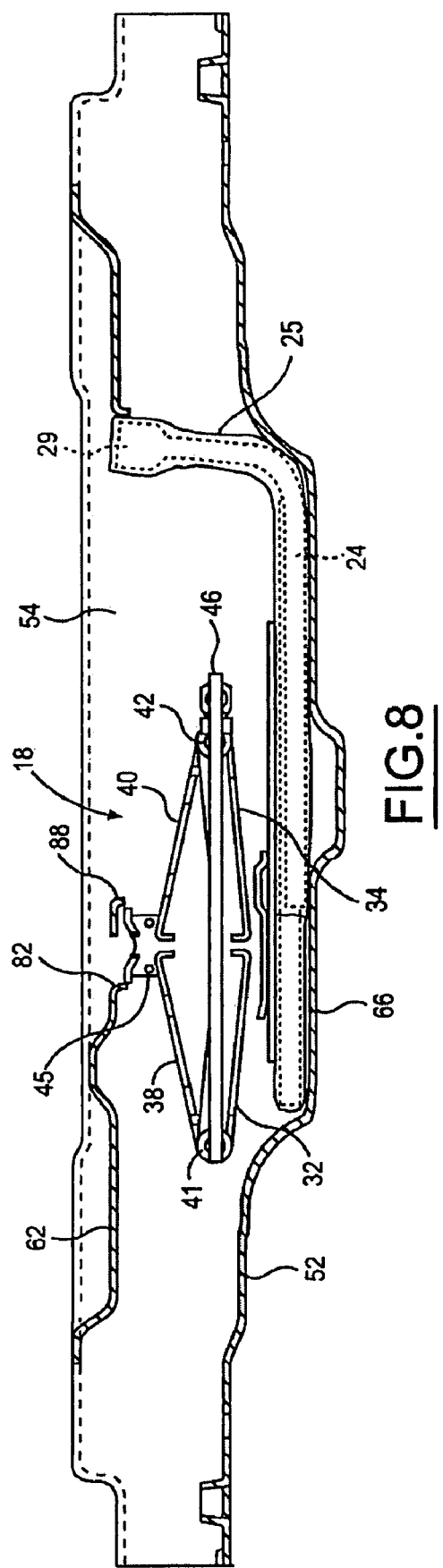
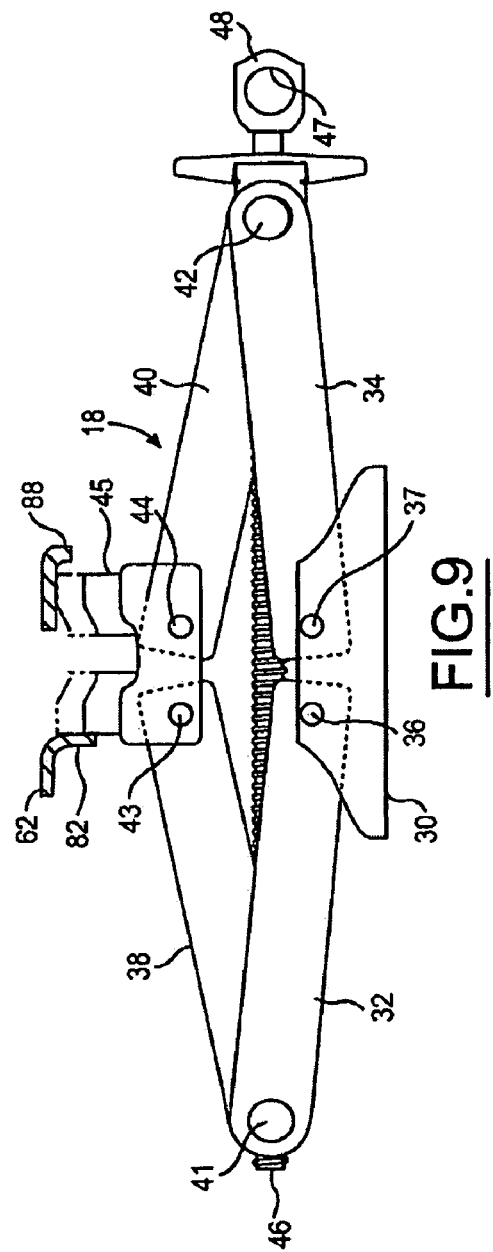

US 7,562,924 B2

VEHICLE JACK AND TOOL BAG INSTALLATION

FIELD OF THE INVENTION

The present invention relates to a jack and tool bag installation for an automotive vehicle.

BACKGROUND OF THE INVENTION

It is not uncommon for a tire on a motor vehicle to fail and in that instance the tire or the wheel and tire assembly must be changed. Typically, vehicles are equipped with a spare tire or a spare tire and wheel assembly, and with some form of jack and basic tools necessary to make the change. However, there is a need for a unique method of storing the jack and tools (preferably with a tool bag), without additional attachment hardware and plastic clips, etc. adapted for stowage in a motor vehicle.

SUMMARY OF THE INVENTION

In accordance with the present invention, an installation is provided for the stowage of a jack and tools useful in the changing of a wheel of a vehicle. The installation comprises a receptacle having an open-top container with a space in the container for the stowage of the jack and the tools. The receptacle includes a cover plate across the top of the container covering a portion of the top only, leaving an access opening through which the jack and the tools may be inserted into and removed from the space within the container.

In a preferred embodiment of the invention about to be described, the bottom wall of the container has a well to be occupied by the tools, and raised rests on the opposite sides of the well upon which the jack is adapted to be seated.

Preferably, the installation is placed in a recess in the deck of a cargo area of a vehicle so that the installation does not project above the level of the deck.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 4 is a top plan view of the container with the cover plate removed, showing the tools in the container but with the jack removed;

FIG. 5 is an enlarged fragmentary plan view of the container with the cover plate removed, showing the jack and portions of the tools;

FIG. 8 is a sectional view taken on the line 8-8 in FIG. 2, showing the jack and the tools in the container; and FIG. 9 is an enlarged elevational view of the jack.

DETAILED DESCRIPTION OF THE PREFERRED EMBODIMENT

The following description of the preferred embodiment is merely exemplary in nature and is in no way intended to limit the invention, its application, or uses.

Figure 1:
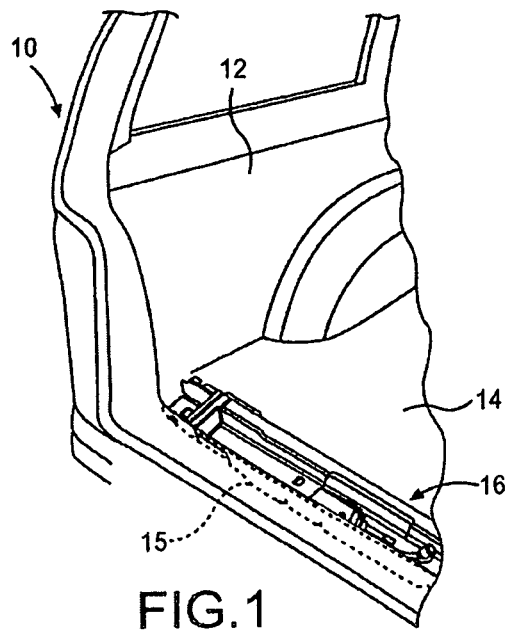
FIG. 1 is a fragmentary perspective view showing the installation of this invention installed in a recess in the deck of a cargo area of a vehicle.
Figure 6:
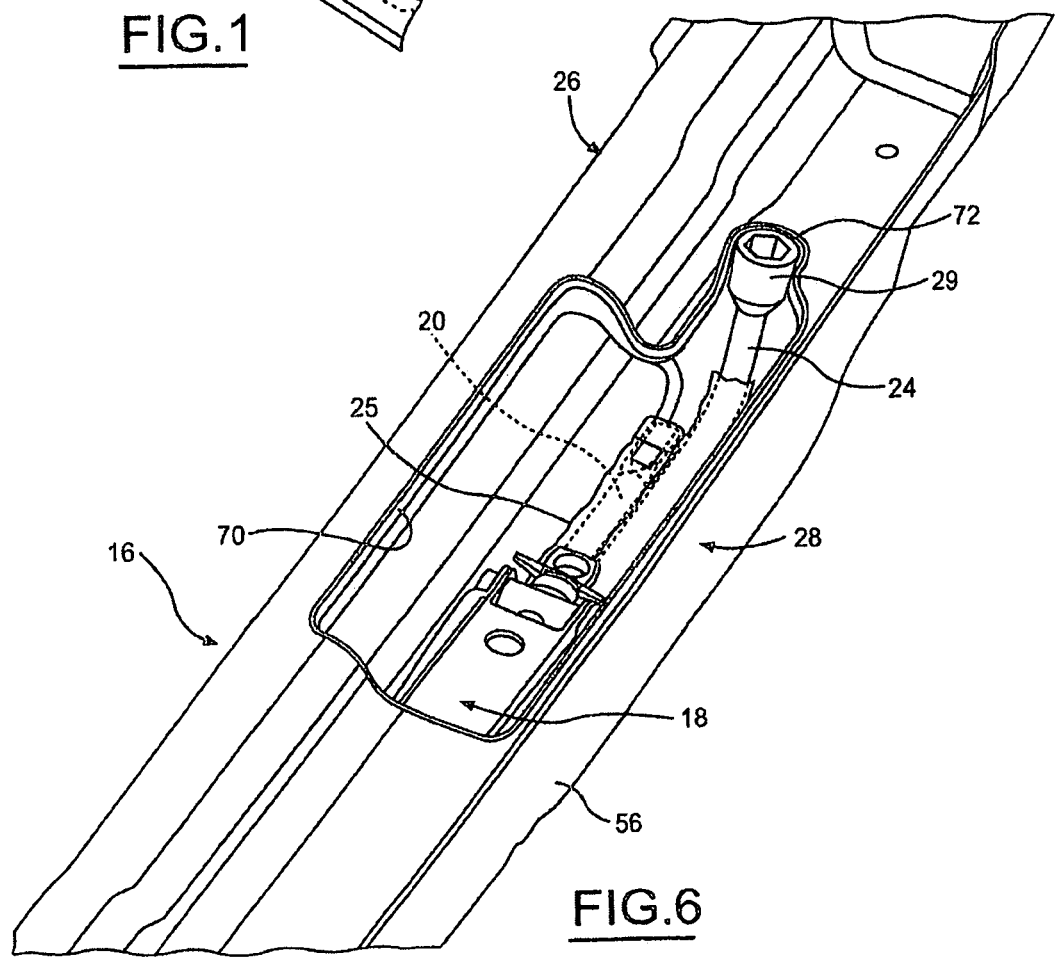
FIG. 6 is an enlarged, fragmentary perspective view of a portion of the installation.
Figure 2:
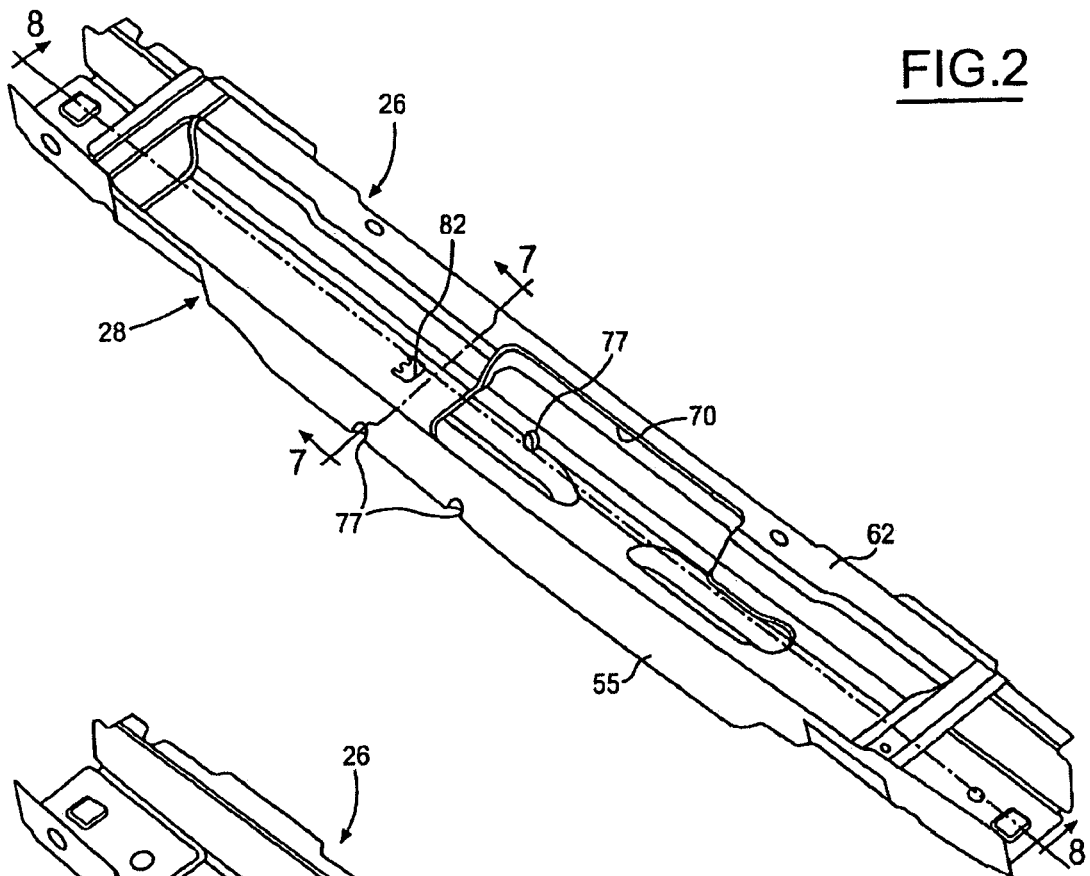
FIG. 2 is a perspective view of the installation, showing a container and cover plate, with the jack and the tools removed.
Figure 3:
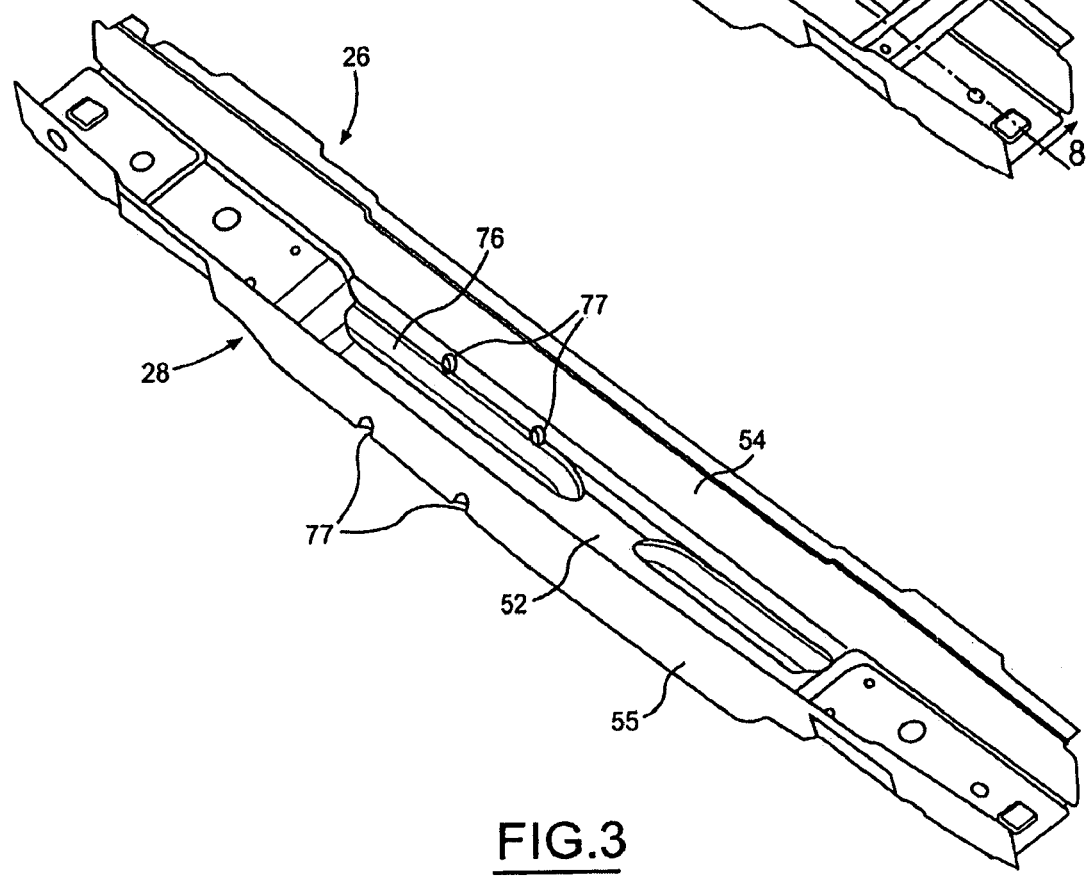
FIG. 3 is a perspective view of the container with the cover plate, jack and tools removed.

Referring now more particularly to the drawings, an automotive vehicle 10 is seen from the rear in FIG. 1 with the tailgate (not shown) open to expose a cargo area 12. The horizontal deck 14 of the cargo area has a transverse recess 15 and in the recess is an installation 16 for the stowage of a vehicle jack 18 and tools 20, 22 and 24 useful in the changing of a wheel of the vehicle. The tools are preferably contained in a bag 25.

The installation comprises a receptacle 26 including an open-top container 28 having space therewithin to accommodate the jack 18 and the tools 20, 22 and 24.

The tools 20 and 22 are long straight bars and the tool 24 is a long bar having a lug wrench socket 29 on a curved end thereof.

The jack 18 is of a well-known construction, having a base plate 30 and lower arms 32 and 34. See FIG. 9. The lower arms have inner ends respectively pivoted to the base plate by transverse pivot pins 36 and 37 and extend in opposite directions away from the base plate. The jack 18 also has upper arms 38 and 40. The upper arms have outer ends pivoted to the outer ends of the respective lower arms 32 and 34 by transverse pivot pins 41 and 42. The upper arms 38 and 40 extend toward one another and have their inner ends pivoted by the respective pivot pins 43 and 44 to a lift plate 45. A screw 46 is rotatable in the pivot pin 42 and is threaded in the pivot pin 41 so that rotation of the screw 46 pulls the pivot pins 41 and 42 toward one another to cause the lift plate 45 to be elevated, thereby raising a vehicle resting on the lift plate far enough to change a vehicle wheel. The screw 46 may be rotated by inserting any tool into a hole 47 in a head 48 on one end of the screw.

The container 28 is an elongated trough-like structure having a bottom wall 52, and laterally spaced apart side walls 54 and 56. The top of the container 28 is partially closed by a horizontal cover plate 62 which is welded or otherwise secured to the upper edges of the side walls of the container.

The receptacle 26 is disposed entirely within the recess 15 in the deck 14 in a position such that the cover plate 62 is at or below the level of the deck.

The bottom wall 52 of the container is depressed to provide an elongated well 66. The tools 20, 22 and 24 when stowed in the container, extend lengthwise in the well in a side-by-side parallel relationship.

The cover plate 62 closes both end portions of the container 28 and has a central access opening 70 which is large enough to permit the jack 18 and the tools 20, 22 and 24 to be inserted into and removed from the container.

The opening 70 in the cover plate has a recess 72 which receives the lug wrench socket portion 29 of the tool 24 when the tool 24 is stowed in the container.

Figure 7:
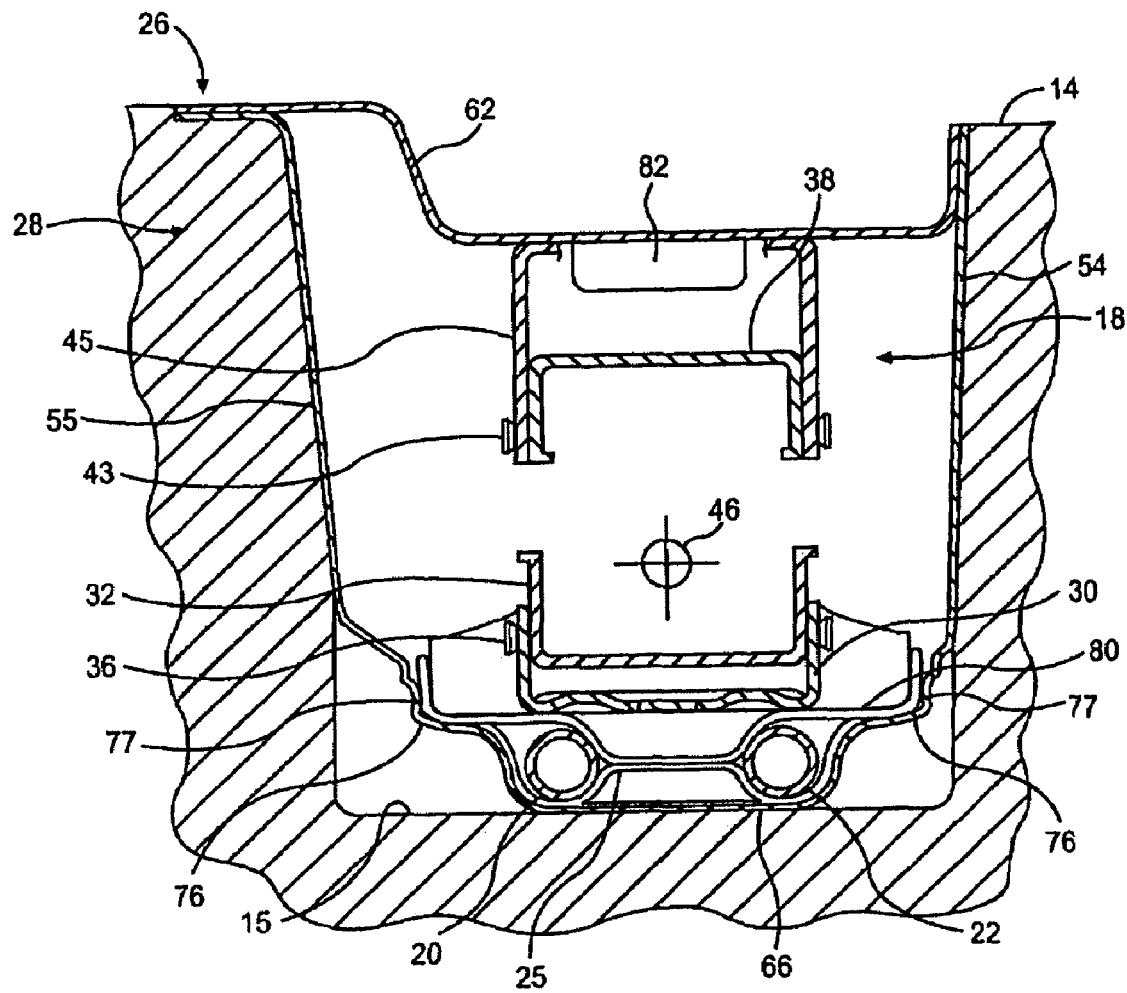
FIG. 7 is a sectional view taken on the line 7-7 in FIG. 2.

The bottom wall of the container 28 has raised rests 76 on opposite sides of the well 66. When stowed, the base plate 30 of the jack 18 is seated on the rests 76. Preferably, and as shown in FIGS. 4 and 7, there is a sheet 80 of sound deadening material, such as ordinary carpeting, extended across the well 66. The opposite side edge portions of the sheet 80 extend over the rests 76 on which the base plate 30 of the jack rests. The sheet 80 prevents direct contact between the jack and the tools to reduce or eliminate rattle. The side walls 54 and 56 of the container 28 have inwardly extending darts 77 to locate the base plate 30 of the jack laterally.

The cover plate 62 has a down-turned flange 82. The flange 82 is engageable with the lift plate 45 of the stowed jack to locate the jack lengthwise within the container.

When stowing the tools and the jack in the container, the tools are first inserted through the access opening 70 and laid in the well 66 parallel to one another. The center tool 24 is manually slid lengthwise until the lug wrench socket 29 is extended into the locating recess 72 in the cover plate. The sheet 80 of sound insulating material is next inserted through the access opening 70 and laid across the well 66 with its opposite side edge portions applied over the rests 76. The sheet 80 will also rest on the stowed tools. Finally the fully retracted jack is inserted through the access opening 70 and seated on the opposite side edge portions of the sheet 80 so as to be supported on the rests 76. The jack is manually moved lengthwise in the container until its lift plate 45 abuts the flange 82 on the cover plate 62. The lift plate initially is spaced below the cover plate. Using a screw driver or the like to rotate the jack screw 46, the lift plate 45 of the jack is raised sufficiently to engage the undersurface of the cover plate 62 in pressure frictional contact therewith. This can be done by a person reaching through the access opening 70. The pressure contact of the lift plate 45 of the jack with the cover plate 62 serves to positively locate or lock the jack in a properly stowed position with the lift plate in contact with the flange 82 of the cover plate. The jack in this position bears down on the tools through the sheet 80 to prevent any shifting about of the tools. The cover plate has a down-turned flange 88 along a portion of the opening 70 which is spaced from the flange 82 and will limit any longitudinal shifting of the stowed jack away from the flange 82 as may occur as a result of extreme jostling, even though the lift plate 45 is pressing against the cover plate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An installation in a cargo area of a vehicle for the stowage of a vehicle jack and tools useful in the changing of a wheel of the vehicle, comprising:
    a recess in a horizontal deck of the cargo area,
    a receptacle in the recess,
    said receptacle comprising an open top container having space therewithin to accommodate the jack and the tools,
    said receptacle including a cover plate across the top of the container covering a first portion of the top only, defining an access opening in a second portion of the top permitting the jack and the tools to be inserted into and removed from the space in the container,
    said receptacle being disposed entirely within the recess in a position such that the cover plate is at or below the level of the horizontal deck,
    wherein the container has a bottom wall comprised of a plurality of spaced apart raised rests upon which the jack is adapted to be seated, and
    wherein the cover plate has a flange adapted to abut and locate a portion of the jack.

2. The installation of claim 1, wherein one of the tools comprises a lug wrench and the access opening defined by the cover plate includes a second recess adapted to receive and locate a portion of the lug wrench.

3. The installation of claim 1, wherein said cover plate has an undersurface adapted to be engaged by a portion of the jack when the jack is slightly raised from a lowered position.

4. The installation of claim 3, wherein the jack, while stowed in the container, is accessible through the access opening to enable an operator to slightly raise the jack from the lowered position.

5. The installation of claim 1, wherein the bottom wall is formed with a well to be occupied by the tools with the raised rests disposed on opposite sides of the well.

6. The installation of claim 1, further comprising a sheet of sound deadening material received in the container and disposed between the jack and the tools.

7. The installation of claim 1, wherein the access opening has a second recess adapted to receive and locate a lug wrench portion of one of the tools, the cover plate has a flange adapted to abut and locate a portion of the jack, the cover plate has an undersurface adapted to be engaged by a portion of the jack when the jack is slightly raised from a lowered position, and the jack, while stowed in the container, is accessible through the access opening to enable an operator to slightly raise the jack from the lowered position.

8. The installation of claim 7, wherein a sheet of sounding deadening material is extended across the area between the rests to separate the jack from the tools.

9. An installation for the stowage of a jack and tools useful in the changing oh wheel of a vehicle, comprising:
    a receptacle,
    said receptacle comprising an open-top container having a space therewithin to accommodate the jack and the tools,
    said receptacle including a cover plate across the top of the container covering a first portion of the top only, but leaving an access opening in a second portion of the top to permit the jack and the tools to be inserted into and removed from the space within the container,
    wherein said container has a bottom wall formed with a well to be occupied by the tools, and
    wherein one of the tools comprises a lug wrench and the access opening defined by the cover plate includes a second recess adapted to receive and locate a lug wrench socket of the lug wrench.

10. The installation of claim 9, wherein the cover plate has a flange adapted to abut and locate a portion of the jack.

11. The installation of claim 9, wherein said cover plate has an undersurface adapted to be engaged by a portion of the jack when the jack is slightly raised from a lowered position.

12. The installation of claim 11, wherein the jack, while stowed in the container, is accessible though the access opening to enable an operator to slightly raise the jack from the lowered position.

13. The installation of claim 9, wherein said container has raised rests on opposite sides of the well upon which the jack is adapted to be seated.

14. The installation of claim 13, wherein a sheet of sound deadening material is extended across the area between said rests to separate the jack from the tools.

15. The installation of claim 13, wherein the access opening has a second recess adapted to receive and locate a lug wrench portion of one of the tools, the cover plate has a flange adapted to abut and locate a portion of the jack, the cover plate has an undersurface adapted to be engaged by a portion of the jack when the jack is slightly raised from a lowered position, and the jack, while stowed in the container, is accessible through the access opening to enable art operator to slightly raise the jack from the lowered position.

16. The installation of claim 15, wherein a sheet of sounding deadening material is extended across the area between the rests to separate the jack from the tools.

17. An installation for the stowage of a jack and tools useful in the changing of a wheel of a vehicle that includes a container in combination with the jack and the tools comprising:
 a jack comprised of a base plate disposed in operable cooperation with a lift plate movable relative thereto and a plurality of tools with one of the tools adapted to actuate the jack,
 an elongate container comprised of a bottom wall, a pair of spaced apart sidewalls extending outwardly from the bottom wall, and a cover plate fixed to the sidewalls and defining an access opening through which the jack and the tools can be inserted or removed, wherein the container comprises a plurality of spaced apart locators that engage and locate the jack therein and an elongated well formed therein in which the plurality of tools extend.

18. The installation of claim 17 wherein the jack comprises a scissors lift vehicle jack, one of the plurality of locators comprises a plurality of locator darts disposed along each sidewall that engage and laterally locate the jack at or adjacent one end of the jack, and another one of the plurality of locators comprises a flange that extends downwardly from the cover plate into the container that engages and locates the jack at or adjacent the other end of the jack.

\* \* \* \* \*